D. C. MEARA.
CARBURETER.
APPLICATION FILED NOV. 21, 1914.
1,169,340.
Patented Jan. 25, 1916.
2 SHEETS—SHEET 1.
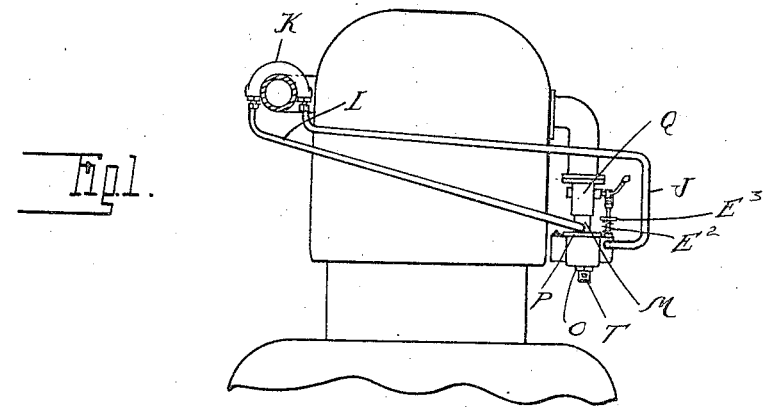
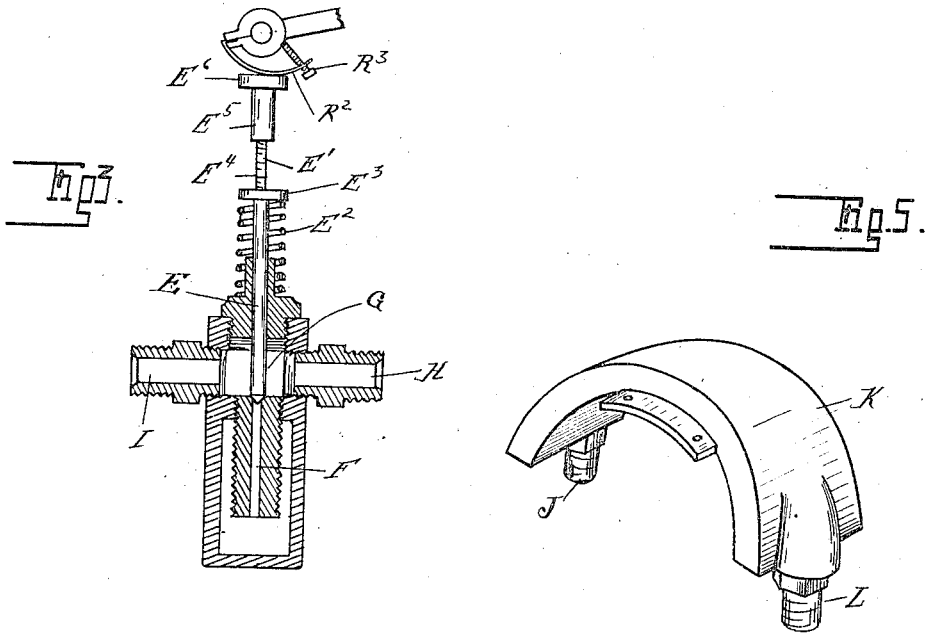
WITNESSES:
INVENTOR
David C. Meara
BY
Whittemore Hulbert & Whittemore
ATTORNEYS D. C. MEARA.
CARBURETER.
APPLICATION FILED NOV. 21, 1914.
1,169,340.
Patented Jan. 25, 1916.
2 SHEETS—SHEET 2.
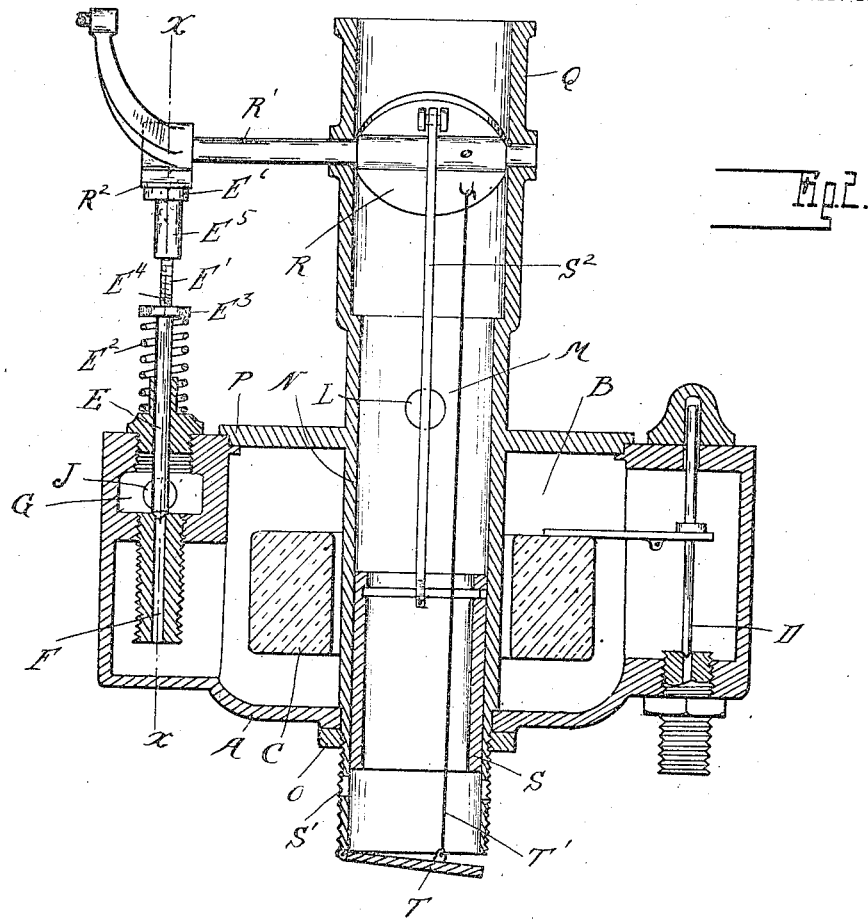
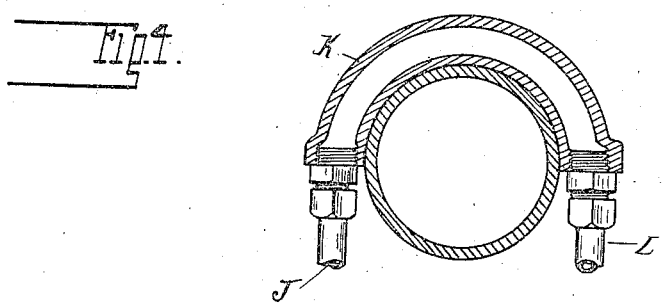
WITNESSES:
INVENTOR
David C. Meara
BY
Whittemore Hulbert & Whittemore
ATTORNEYS

UNITED STATES PATENT OFFICE.

DAVID C. MEARA, OF DETROIT, MICHIGAN, ASSIGNOR, BY DIRECT AND MESNE ASSIGNMENTS, OF ELEVEN-TWENTIETHS TO JAMES H. MEANS, OF DETROIT, MICHIGAN.

CARBURETER.

1,169,340.  Specification of Letters Patent.  Patented Jan. 25, 1916.

Application filed November 21, 1914. Serial No. 873,322.

*To all whom it may concern:*

Be it known that I, DAVID C. MEARA, a citizen of the United States of America, residing at Detroit, in the county of Wayne and State of Michigan, have invented certain new and useful Improvements in Carbureters, of which the following is a specification, reference being had therein to the accompanying drawings.

The invention relates to carbureters particularly designed for use upon motor vehicles, and it is the primary object of the invention to provide a construction which is attachable to any motor vehicle engine and which has provision for heating the liquid fuel before commingling the same with the air.

It is a further object to improve various features of construction as hereinafter set forth.

In the drawings: Figure 1 is a diagram showing the carbureter as applied to an engine; Fig. 2 is a longitudinal section through the carbureter; Fig. 3 is a cross section on line $x$—$x$ Fig. 2; Fig. 4 is a cross section through the heater for the oil; and Fig. 5 is a perspective view thereof.

A is the casing containing the chamber B with a float C therein controlling the oil-admission valve D.

E is a valve controlling a discharge passage F from the float chamber communicating with a passage G extending transversely of the casing and having an air inlet H at one end thereof. The opposite end of the passage G is connected by a nipple I to a conduit J, which is sufficient length to extend to the exhaust manifold of the engine, where it is connected with a segmental hollow member K adapted to be hung over said manifold. The member K is also connected at its opposite end with a conduit L which returns to the carbureter and connects with the suction conduit M. This suction conduit is preferably arranged centrally within the float chamber B and is preferably formed in a member N separate from the member A and rotatively adjustably seated in the bottom thereof. A lock-nut O engaging a threaded portion of the member N serves to hold the member to its seat so as to form a liquid-tight seal. The member N has formed integral therewith a cover portion P for the float chamber, and above this cover is a portion Q containing the throttle-valve R preferably of the butterfly type. In addition to the valve R there is preferably provided a hollow piston-valve S controlling ports S′ in the conduit M below the float chamber, said valve being coupled by a connecting rod S² with the butterfly valve R so as to be operated thereby. There is further preferably provided a hinged flap-valve T for closing and opening the lower end of the conduit M, and which is also operated by a connecting rod T′ from the operating mechanism for the valves R and S. The arrangement is such that the opening of the throttle R will simultaneously open the ports S′ and the flap-valve T, while the closing of the throttle will correspondingly close or restrict the ports controlled by the valves S and T.

The valve E which controls the admission of the oil to the conduit G is variably opened in correspondence with the opening of the throttle-valve, preferably by placing on the stem R′ of said throttle-valve a cam R² bearing against the stem E′ of the valve E, while a spring E² engaging a collar E³ serves to hold said stem in engagement with the cam.

With the construction described it will be noted that instead of feeding the oil from the float-chamber directly into the air suction conduit it is fed into the passage G, which is indirectly connected with the suction conduit through the conduits J, segmental fitting K and conduit L. Whenever there is suction in the suction conduit, air will be drawn through the opening H, conduits J K and L, and will carry with it the oil which is admitted into the passage G. In passing through the segmental fitting K the oil will be subjected to the heat of the exhaust manifold, so that it will be partially or wholly vaporized, and when delivered into the conduit M will be in condition for forming an explosion gaseous mixture. The area of the opening H and conduits connected therewith is sufficient for all the air required when the engine is idling, but when the throttle R is opened additional air is supplied by the opening of the ports S′ and the port controlled by the flap-valve T. The result is that even where the temperature is very low the carbureter will be operative.

My improved construction is applicable to engines of different designs and without the necessity of any change in the construction thereof. To facilitate the attachment the member N is rotatively adjustable in the casing A, which permits of reversing the position of the valve stem E' so as to avoid obstructions on the engine casing. Also the member K may be hung upon the exhaust conduit in any convenient location, and the conduits J and L bent to lead therefrom to the carbureter.

For adjustment of the carbureter I preferably provide means for independently adjusting the degree of opening of the valve E when the engine is idling and when running at high speed. For this purpose the stem E' is provided with a threaded portion $E^4$ which is engaged by a correspondingly threaded sleeve $E^5$ having a head $E^6$ which engages the cam $R^2$, so that by adjusting the sleeve upon the stem the length of the latter is altered and the valve is opened to a greater or less extent in its idling position. For variably adjusting the opening of the valve when the throttle is opened for high speed the cam $R^2$ is adjusted preferably by forming it of a flexible metal strip, the outer end of which is attached to an adjusting screw $R^3$ by which the curvature or throw of the cam may be altered. Thus the operator may independently adjust the valve for idling position and for high speed.

For low and intermediate speeds the variation in the feed of the oil is determined by the difference in suction in the indirect air conduit, but for high speed the cam $R^2$ is brought into action, and by adjusting the screw $R^3$ its operation may be varied.

What I claim as my invention is:

1. In a carbureter, the combination with a float chamber, of an air suction conduit passing centrally therethrough, a conduit adjacent to said float chamber open at one end to the atmosphere and extending indirectly to said suction conduit, said indirect conduit including a member attachable to the engine to be under the heat thereof, a throttle valve in said air suction conduit, a valve controlling a passage from said float chamber to said indirect conduit, and means for simultaneously and correspondingly adjusting said valves.

2. In a carbureter, the combination with a float-chamber, of an air suction conduit passing centrally through said float chamber and being rotatively adjustably secured thereto, a cover for said float chamber formed integral with said suction conduit, a throttle valve in said suction conduit, a conduit adjacent to said float chamber open at one end to the atmosphere and extending indirectly to said suction conduit including a member attached to the engine to be under the heat thereof, a valve controlling admission of liquid fuel from said float chamber to said indirect conduit, and a common actuating connection for said throttle valve and liquid valve, by which they may be simultaneously and correspondingly adjusted.

3. In a carbureter, the combination with a float chamber and an air suction conduit, of a conduit open at one end to the atmosphere having a liquid jet connection with said float chamber and extending indirectly to said suction conduit, said indirect conduit including a segmental fitting adapted to be hung over the exhaust manifold of the engine to be heated thereby.

4. In a carbureter, the combination with an air suction conduit and a float chamber for the liquid fuel, of a valve for normally closing said suction conduit, a conduit open at one end to the atmosphere having a liquid jet connection with said float chamber and extending indirectly to said suction conduit, said indirect connection including a member attachable to the engine to be under the heat thereof, a valve controlling the liquid jet, a throttle valve in said suction conduit, and connections between said liquid valve, throttle valve and valve for closing said suction conduit, by which all of said valves are simultaneously and correspondingly opened and closed.

5. In a carbureter, the combination with an air suction conduit and a reservoir for the liquid fuel, of a conduit open at one end to the atmosphere and extending indirectly from said reservoir to said air suction conduit, a valve controlling the discharge of liquid from said reservoir to said indirect conduit, a throttle valve in said suction conduit, a cam upon the stem of said throttle valve for operating the liquid controlling valve, means for adjusting said cam to vary the opening of said valve, and independent means for adjusting said valve to vary its opening in idling position.

6. In a carbureter, the combination with an open end suction conduit provided with apertures in the periphery thereof and a float chamber for the liquid fuel, of a valve normally closing the end of said suction conduit, a second valve normally closing the apertures in the periphery of said conduit, a conduit leading indirectly from said float chamber to said suction conduit including a member attachable to the engine to be heated thereby, a valve for controlling the flow of fuel to said indirect conduit, a throttle valve in said air suction conduit, and means for controlling all of said valves simultaneously and correspondingly with said throttle valve.

In testimony whereof I affix my signature in presence of two witnesses.

DAVID C. MEARA.

Witnesses:
JAMES P. BARRY,
HENRI E. BOWMAN.